United States Patent [19]

Tanaka et al.

[11] Patent Number: 5,285,343
[45] Date of Patent: Feb. 8, 1994

[54] MAGNETIC DISK WITH SURFACE PROTECTIVE LAYER HAVING CONVEX PORTIONS AND MAGNETIC DISK APPARATUS INCLUDING SUCH A MAGNETIC DISK

[75] Inventors: Hideaki Tanaka, Katsuta; Kenichi Gomi; Shoichi Sawahata, both of Hitachi; Maki Kondo, Sendai; Masaki Ohura, Odawara; Norikazu Tsumita, Hiratsuka; Katuo Uda, Kanagawa; Yoshiki Kato, Tokyo; Yoshihiko Miyake, Odawara; Toyoji Okuwaki, Tokyo; Noriaki Okamoto, Ibaraki; Nobuo Nakagawa, Yokohama, all of Japan

[73] Assignee: Hitachi, Ltd., Tokyo, Japan

[21] Appl. No.: 595,414

[22] Filed: Oct. 11, 1990

[30] Foreign Application Priority Data

Oct. 13, 1989 [JP] Japan .................. 1-264934
Mar. 2, 1990 [JP] Japan .................. 2-049281
Apr. 13, 1990 [JP] Japan .................. 2-096448

[51] Int. Cl.$^5$ ............................ G11B 5/74; G11B 5/82
[52] U.S. Cl. ........................................ 360/131; 360/135
[58] Field of Search ............... 360/131, 135; 428/694, 428/695, 900

[56] References Cited

U.S. PATENT DOCUMENTS

| 4,688,130 | 8/1987 | Nakanouchi et al. | 360/135 |
| 4,816,933 | 3/1989 | Izumi et al. | 360/131 |
| 4,939,614 | 7/1990 | Shirakura et al. | |
| 5,047,274 | 9/1991 | Tsuya et al. | 360/135 |
| 5,093,173 | 3/1992 | Nakagawa et al. | 360/135 |

FOREIGN PATENT DOCUMENTS

| 0130063 | 1/1985 | European Pat. Off. . |
| 0218811 | 4/1987 | European Pat. Off. . |
| 57-20925 | 2/1982 | Japan . |
| 59-84348 | 5/1984 | Japan . |
| 59-124031 | 7/1984 | Japan . |
| 60-40528 | 3/1985 | Japan . |
| 61-3322 | 1/1986 | Japan . |
| 63-249933 | 10/1988 | Japan . |
| 0122028 | 5/1989 | Japan . |
| 0134720 | 5/1989 | Japan . |

OTHER PUBLICATIONS

*Patent Abstracts of Japan*, vol. 13, No. 54 (P-824), Feb. 8, 1989 (for Japanese Kokai 63-244312, Oct. 11, 1988).

*Primary Examiner*—A. J. Heinz
*Attorney, Agent, or Firm*—Antonelli, Terry, Stout & Kraus

[57] ABSTRACT

There is provided a magnetic disk apparatus including at least one magnetic disk having a magnetic layer and a surface protective layer on a substrate; a magnetic head which faces the magnetic disk in a rotating state with a micro gap and is supported by a slider; rotating means for rotating the magnetic disk; and magnetic head positioning means for moving and positioning the magnetic head to a predetermined position on the magnetic disk, wherein a plurality of protrusions each having a flat surface are formed in at least a region on the surface of the magnetic disk where a contact start/stop operation can be executed, an area ratio of the protrusions per 1 mm$^2$ lies within a range from 0.1 to 80%, a height of the protrusion of the maximum height among the protrusions lies within a range from 5 to 40 nm, and the magnetic layer is formed on the whole surface on the base plate. According to the above magnetic disk apparatus, the frictional force between the disk and the head is small, and the floating height of the head can be reduced, and good floating stability is obtained, so that excellent recording and reproducing characteristics are obtained.

20 Claims, 9 Drawing Sheets

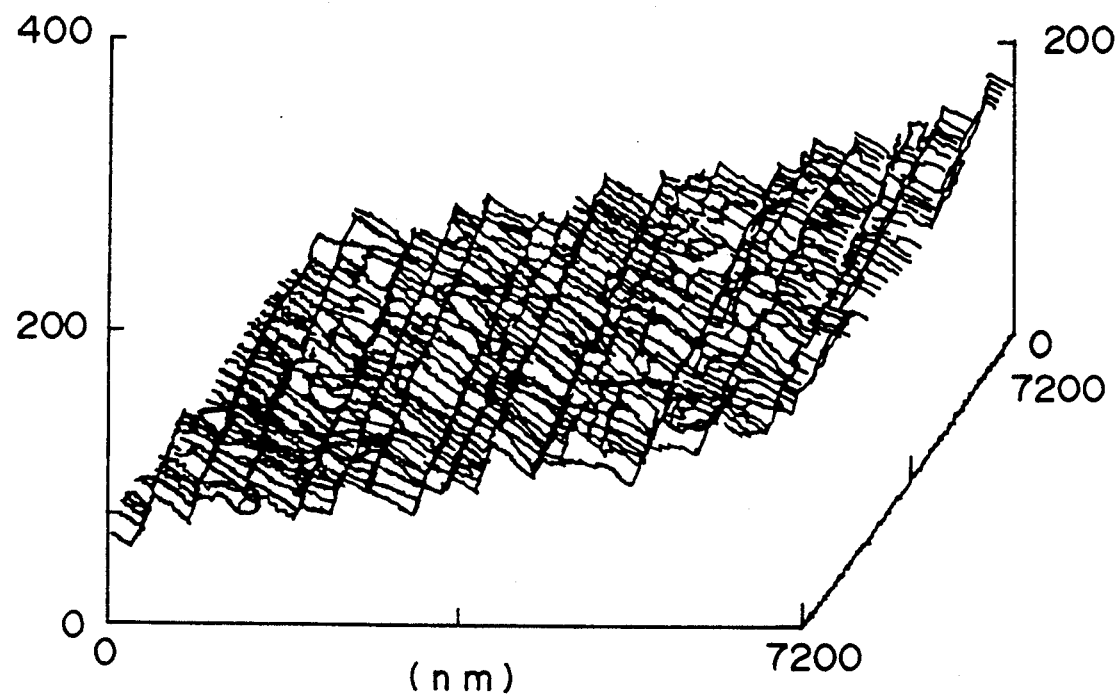

MAGNETIC DISK WITH SURFACE PROTECTIVE LAYER HAVING CONVEX PORTIONS AND MAGNETIC DISK APPARATUS INCLUDING SUCH A MAGNETIC DISK

BACKGROUND OF THE INVENTION

1. Field of the Invention

The present invention relates to a magnetic disk apparatus and a magnetic disk which is used in the magnetic disk apparatus.

2. Description of the Prior Art

In recent years, a significance of a magnetic disk apparatus as an external memory device of a computer system has been more and more increased and its recording density has remarkably been improved every year.

It is better to reduce a floating amount of a magnetic head upon recording/reproduction in order to improve the recording density of the magnetic disk apparatus. To assure the floating stability of the magnetic head in such a case, it is required that the surface of a magnetic disk is as flat as possible.

On the other hand, upon actuation and stop of the magnetic disk apparatus, a frictional force which is generated between the magnetic head and the magnetic disk causes an abrasion between them and becomes a cause of deterioration of characteristics such as a writing characteristic, a reading characteristic, and the like. Further, if moisture or the like exists between the magnetic head and the magnetic disk in a stop state of the magnetic disk, both of them are strongly adsorbed. If the apparatus is actuated in such a state, a large frictional force occurs between the magnetic head and the magnetic disk and there is a fear such that the magnetic head and the magnetic disk are damaged. There is a tendency such that the above frictional force increases as the surface of the magnetic disk is flat. Such a tendency is contradictory to the requirement for the floating stability of the magnetic head in association with the improvement of the recording density mentioned above.

There has been known a method whereby micro depressions and protrusions portions are formed on the surface of the magnetic disk in order to reduce such a frictional force.

In JP-A-1-134720, for instance, there has been disclosed a method whereby island-like protrusions are formed on the surface of a magnetic disk.

In JP-A-1-122028, there has been disclosed a method whereby a metal alkoxide solution is coated onto the surface of a magnetic layer of a magnetic disk and is rapidly heated and a protective layer having depressions and protrusions portions is formed onto the surface of the magnetic layer.

In JP-A-57-20925, there has been disclosed a method whereby cylindrical protrusions each having a diameter of 0.03 to 0.1 mm and a height of about 0.05 μm are formed onto the surface of a magnetic layer or a protective layer.

All of the above conventional techniques intend to reduce a floating amount of the magnetic head for the magnetic disk and to prevent, in such a case, a slider to support the magnetic head from being adsorbed to the magnetic disk.

In the above conventional techniques, nothing is considered with respect to a point that the floating stability of the magnetic head is maintained for a long time.

SUMMARY OF THE INVENTION

It is an object of the present invention to provide a magnetic disk which can maintain the floating stability of a magnetic head.

Another object of the invention is to provide a magnetic disk apparatus having a magnetic disk which can accomplish the above object.

Still another object of the invention is to provide a magnetic disk apparatus which can suppress a floating amount of a magnetic head to 0.2 μm or less and can maintain the floating stability for a long time and also to provide a magnetic disk for the above purpose.

A magnetic disk apparatus of the invention comprises at least one magnetic disk which essentially has a magnetic layer and a surface protective layer on a substrate; a magnetic head which faces the rotating magnetic disk with a micro gap and is supported by a slider; rotating means for rotating the magnetic disk; and magnetic head positioning means for moving and positioning the magnetic head to a predetermined position on the magnetic disk, wherein a plurality of protrusions each having a flat surface are formed in at least a region which can execute a contact start/stop operation on the surface of the magnetic disk, an area ratio of the protrusions is set to 0.1 to 80% per 1 $mm^2$, a height of the protrusion having the maximum height among the protrusions lies within a range from 5 to 40 nm, and the magnetic layer is formed on the whole surface of the substrate.

The invention is based on the investigation of the fact that the protrusions which satisfy the foregoing requirements are formed in the region which can execute the contact start/stop (CSS) operation on the surface of the magnetic disk and the magnetic layer is formed on the whole surface of the substrate, so that the floating amount of the magnetic head is reduced and the floating stability can be maintained.

Thus, the floating amount of the magnetic head can be set to a remarkably small value and the floating amount of the magnetic head can be held almost constant. Particularly, it is important to control both the protrusion area ratio of the protrusions which are formed on the surface and the protrusion heights to values within predetermined ranges. However, in the conventional techniques, there is no idea such that both of the protrusion area ratio and the maximum protrusion height are controlled to values within specified ranges by paying an attention to them.

The significance of the above technique is particularly remarkable as the floating amount of the head is reduced to realize a high recording density of the magnetic disk apparatus, for instance, in the case where the floating amount is set to a value within a range from 0.02 to 0.2 μm.

According to the invention, only the surfaces of the protrusions directly face the head and the area ratio of the magnetic disk which is come into contact with the head can be decreased, so that the frictional force with the head can be reduced.

On the other hand, by controlling the maximum protrusion height to a value within a specified range, the fluctuation of the floating amount of the head is small, the floating stability of the head can be assured over the whole surface of the magnetic disk, and the fluctuation of the output due to the floating amount fluctuation can be prevented.

As mentioned above, the frictional force with the head can be reduced, the output fluctuation can be prevented, and the stable floating of the head can be assured. Therefore, it is possible to obtain a magnetic disk which has a high recording/reproducing accuracy and can cope with a low floating amount of the head due to the realization of a high recording density and also to obtain a magnetic recording apparatus using such a magnetic disk.

Further, the protrusions to be formed are arranged so as to rapidly eliminate micro dust deposited on the head or the magnetic disk, so that a head crash by the micro dust cannot easily occur and the floating stability of the head can be assured for a long time.

To enable the dusts deposited on the magnetic head or the magnetic disk to be promptly eliminated, (i) it is desirable that the protrusions of the magnetic disk are separated on the same circumference and the same radius, a depression is formed between the protrusions, and an interval between the closest protrusions on the magnetic disk is set to a value within a range from 0.2 to 50 $\mu$m, and (ii) it is particularly desirable to arrange the protrusions so as to face the whole surface of the slider when the slider is put at an arbitrary position on the magnetic disk and the magnetic disk is rotated once.

By satisfying the requirement of the above item (ii), the dust which is deposited onto the magnetic head and the slider can be scraped off by the protrusions.

By satisfying the requirement of the above item (i), the dust which is scraped off from the magnetic head and the slider can be discharged to the outside of the slider by using the depressions between the protrusions on the surface of the magnetic disk.

As a magnetic disk of the invention, it is possible to use a disk such that a plurality of continuous or discontinuous arc-shaped protrusions of an almost constant width are formed on the substantially flat disk surface and a magnetic layer is continuously formed from the protrusion until the portion of a groove between the protrusions.

It is preferable that the protrusion has an annular shape which is concentrical or almost concentrical or a spiral shape. The protrusion can be discontinuous by being separated at several positions in the circumferential direction. However, in the case of the discontinuous protrusions, it is desirable that the separated protrusions are regularly or almost regularly arranged when they are seen in the same circumferential direction.

It is desirable that the protrusions are arranged in the radial direction of the disk regularly or at regular intervals. By forming the protrusions in the disk radial direction at regular intervals or at almost regular intervals, there is an effect such that the frictional force can be made substantially constant in the surface.

The inventors have examined various shapes of the protrusions and depressions to be formed on the magnetic disk. Thus, they have found out that it is extremely important that in order to assure the floating stability of the magnetic head for a long time, when a magnetic layer and a surface protective layer are formed onto a base plate and depressions and protrusions are formed on the surface of the surface protective layer, the arrangement of the depressions and protrusions has a function such that the micro dust deposited on the magnetic head or the magnetic disk can be rapidly eliminated.

In all of JP-A-1-134720, JP-A-1-122028, and JP-A-57-20925 as conventional techniques, nothing is disclosed with respect to a point that the dust eliminating function is provided by the depressions and protrusions on the surface of the magnetic disk. On the other hand, the depressions and protrusions or the arrangement of the depressions and protrusions adapted to have the dust eliminating function are not provided.

According to the invention, it is preferable that each of the protrusions on the surface of the magnetic disk has a flat surface. Particularly, it is desirable that the heights of all of the protrusions are held to an almost constant height.

If the surfaces of the protrusions are sharply pointed or the flat surface of the protrusions partially has a sharp projection, the floating stability of the magnetic head deteriorates. In the worst case, there is a fear such that the magnetic disk or the magnetic head is damaged because the magnetic head comes into contact with the magnetic disk.

Further, there is a problem such that unevenness of the depressions and protrusions influences on the floating stability of the magnetic head and even if the magnetic head does not come into contact with the magnetic disk, the floating amount can easily change. Consequently, it is preferable that the protrusions are regularly or almost regularly arranged.

The fluctuation of the floating amount of the magnetic head causes an output fluctuation upon recording-/reproduction and becomes a cause of the deterioration of the S/N ratio. Further, since an output of a servo signal to position the magnetic head also fluctuates due to the fluctuation of the floating amount, there is also a problem such that the positioning accuracy of the magnetic head deteriorates. The problem by the floating amount fluctuation of the magnetic head as mentioned above becomes particularly remarkable as the floating amount is reduced to realize a high recording density of the magnetic disk apparatus, for instance, in the cases where the floating amount is set to 0.2 $\mu$m or less and where the track width is reduced.

As a reference to determine that the surface of the protrusion is flat, it is desirable that the protrusion surface does not have a projection of a height which exceeds 30% of the maximum protrusion height when the protrusion height (height from the center line of the upper surface of the protrusion until the center line of the adjacent depression) of an arbitrary length, for instance, a length of 100 $\mu$m in the circumferential direction of the surface of the magnetic disk is measured by using a tracer type roughness measuring instrument.

On the other hand, as a reference to determine that the protrusion heights are almost constant, it is desirable that a protrusion of a height which exceeds 30% or is smaller than 30% of the average value of the heights of the protrusions having heights which are equal to or larger than 50% of the maximum protrusion height does not exist when the protrusion height of an arbitrary length, for instance, 100 $\mu$m is measured by using the tracer type roughness measuring instrument.

It is desirable that a distance between the closest protrusions of the magnetic disk lies within a range from 0.2 to 50 $\mu$m.

It is desirable that the number of protrusions is equal to or larger than 400/mm$^2$ and does not exceed 250,000/mm$^2$.

If the protrusions sparsely exist, a turbulence of the air flow can easily occur and a fluctuation of the floating amount of the magnetic head can easily occur. On the contrary, if the protrusions fairly densely exist, it becomes difficult to discharge the dust.

It is preferable that the size of each protrusion is equal to or larger than 0.1 μm and is equal to or smaller than 10 μm with respect to the width in the radial direction of the magnetic disk and is equal to or larger than 0.5 μm and is equal to or smaller than 1 mm with regard to the width in the circumferential direction of the magnetic disk.

If the size of each protrusion is smaller than 0.1 μm with respect to the width in the radial direction of the magnetic disk, when the dust collides with the protrusion, there is a fear such that the protrusion is damaged because its strength cannot endure. If the width of the protrusion in the radial direction is larger than 10 μm, it becomes difficult to move the dust to both the right and left sides of the protrusion, so that there is a fear such that the dust is adhered to the surface of the protrusion.

If the width of the protrusion in the circumferential direction is smaller than 0.5 μm, when the dust collides with the protrusion, its strength is weak. On the contrary, if the width of the protrusion in the circumferential direction is larger than 1 mm, there is a fear such that it becomes difficult to discharge the dust in the radial direction of the magnetic disk.

It is desirable that the height of the protrusion is higher than 5 nm and is lower than 40 nm and has an almost constant height within a range from 5 nm to 40 nm. Particularly, a range of 5 to 20 nm is desirable.

Further, in the protrusion forming region on the surface of the magnetic disk, it is desirable that an area ratio of the total area of the protrusions per one $mm^2$ is equal to or larger than 0.1% and is equal to or smaller than 80%. Particularly, a range of 0.5 to 20% is suitable. A range of 1 to 10% is most preferable.

It is desirable that the protrusions are regularly or almost regularly arranged on the surface of the magnetic disk in a manner such that a deviation of the area ratio per one $mm^2$ of the protrusions on the same circumference is equal to or smaller than 20%. That is, if A represents a desired area ratio of the protrusions on a given circumference of the magnetic disk, then the area ratio at any point on the given circumference should lie within a range from 0.8 to 1.2 A.

If a distribution of the protrusions is remarkably scattered, there is a fear such that a fluctuation of the floating amount of the magnetic head occurs.

It is desirable to also form the bottom surface of the depression as a flat surface as possible in order to enable the dust to be easily discharged to the outside of the magnetic disk by using the depressions between the protrusions on the magnetic disk surface.

As a reference to determine that the bottom surface of the depression is a flat surface, it is desirable that the depression does not have a protrusion of a height which exceeds 30% of the maximum height of the protrusion of an arbitrary length, for instance, a length of 100 μm when measured by using the tracer type roughness measuring instrument.

Further, in order to enable the dust to be easily discharged toward the outer periphery of the magnetic disk, it is desirable to arrange the protrusions in a manner such that when the magnetic disk is rotated, the protrusions are positioned so as to be sequentially deviated to the outer peripheral side of the magnetic head.

According to the invention, a gap between the magnetic disk and the magnetic head can be set to a micro gap within a range from 0.02 to 0.2 μm, which could not be obtained so far, and the floating amount can be stably maintained.

The protrusions on the surface of the magnetic disk can be formed by, for instance, the following methods ① to ③.

① The protrusions are directly formed on the surface of the substrate or are formed on the surface of the substrate having an under layer.

② The protrusions are formed on the surface of the magnetic layer.

③ The protrusions are formed on the surface of the protective layer.

In all of the above cases ① to ③, the magnetic layer is formed on the whole surface of the substrate and it is desirable that the magnetic layer is not divided by grooves.

In the case where the floating amount of the magnetic head is set to an extremely small value within a range from 0.02 to 0.2 μm, if protrusions and depressions exist on the surface of the magnetic layer, they easily exert an influence on a deterioration of the S/N ratio. Therefore, in the case of remarkably reducing the floating amount of the magnetic head as mentioned above, it is preferable to use the method ③ whereby the magnetic layer surface is made flat and the protrusions are formed on the surface protective layer on the magnetic layer.

However, even in the case where the protrusions were formed on the surface of the base plate or the surface of the magnetic layer as in the methods ① and ②, if the shapes of the protrusions formed are substantially maintained out to the surface of the magnetic disk, a sufficient effect is obtained to maintain the stability of the floating amount.

The base plate of a general magnetic disk comprises an aluminum alloy disk and a hard under layer formed thereon. The under layer can be also omitted in the case of using a disk material having a high hardness such as glass, ceramics, or the like in place of aluminum alloy. In the invention, all of the disks made of the above materials are incorporated and are generally referred to as substrate. The magnetic layer is formed on the base plate. There is also a case where an intermediate layer is formed between them in order to improve the adhesive property and the characteristics of the magnetic layer. A protective layer is formed on the magnetic layer and a lubricating layer is further formed as necessary, thereby constructing the magnetic disk.

In the invention, both of the protective layer and the lubricating layer are generally referred to together as a surface protective layer.

The number of protective layers is not limited to only one but a plurality of protective layers can be formed.

The following methods (a) to (d) are preferable as methods of manufacturing the magnetic disk.

(a) A mask pattern is formed on the surface of the protective layer. The protective layer is etched within a range of the film thickness in accordance with the mask pattern. After that, by eliminating the mask pattern, protrusions of desired shapes and dimensions are formed and the lubricating layer is then formed thereon.

(b) A mask pattern is formed on the surface of the protective layer by a lithography technique. The protective layer is etched within a range of the film thickness in accordance with the mask pattern. After that, by eliminating the mask pattern, the protrusions of desired dimensions and shapes are formed. Then, the lubricating layer is formed thereon.

(c) A material which can be hardened by irradiating a light beam, a laser beam, or a beam of charged particles is formed like a film onto the surface of the protective layer. The light beam, laser beam, or charged particle beam is selectively irradiated onto the film surface and the film surface is partially hardened. After that, by eliminating the unhardened portions, protrusions of desired dimensions and shapes are formed. Then, the lubricating layer is formed thereon.

(d) In a method of manufacturing a magnetic recording medium by forming a lubricating layer and two protective layers as a surface protective layer, after the two protective layers are formed, a mask pattern is formed on the surface and the second protective layer serving as the upper layer is etched in accordance with the mask pattern. After that, by eliminating the mask pattern, protrusions of desired dimensions and shapes are formed on the surface of the first protective layer. Then, the lubricating layer is formed.

BRIEF DESCRIPTION OF THE DRAWINGS

FIG. 16 is a graph showing an example of the result in the case where the surface of the magnetic disk according to a comparison example of the invention was measured by using a scanning tunneling microscope (STM).

DESCRIPTION OF THE PREFERRED EMBODIMENTS

The invention will be practically described hereinbelow.

It is assumed that the protrusions which are formed on the surface of a surface protective layer of a magnetic disk are discontinuous on the same circumference of the magnetic disk. This is because in the case where a magnetic head is held in the stationary state and the magnetic disk is rotated, the magnetic head intermittently faces the protrusions when such a state is seen from a certain point of the magnetic head, so that even if micro dust is deposited on the magnetic head, it is easily eliminated.

On the other hand, it is desirable that the protrusions which are formed on the surface of the surface protective layer have a discontinuous linear or pit shape and at least a part of the portion having no protrusion is linearly continuous from the inner rim to the outer rim of the magnetic disk in the moving region of the magnetic head. This is because even in the case where micro dusts enters the gap between the magnetic head and the magnetic disk, the micro dusts is easily eliminated to the outer peripheral side along the portion having no protrusion by a centrifugal force.

Figure 4:
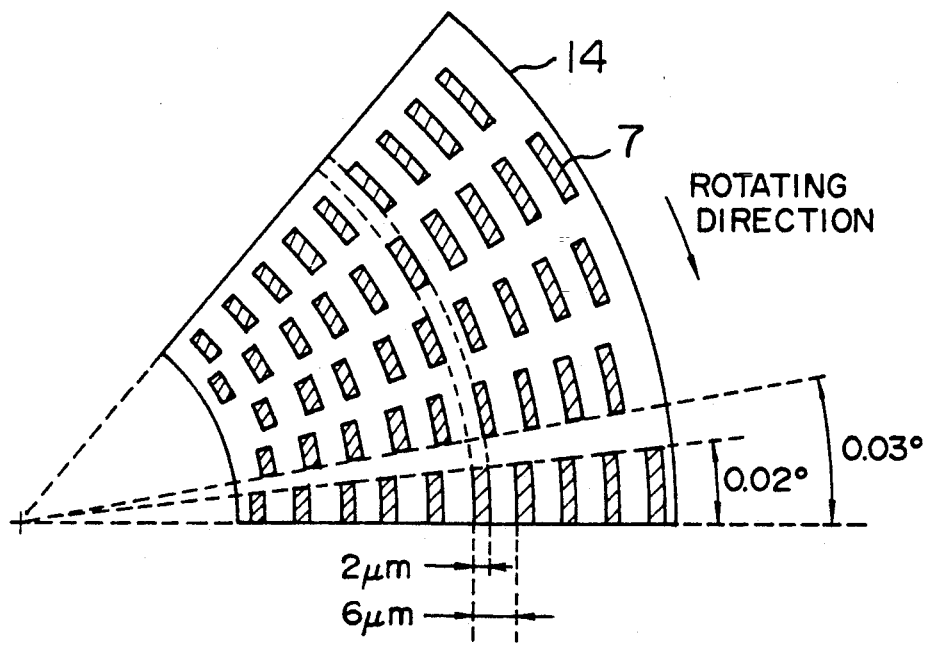
FIGS. 4 to 6 are partial plan views showing arrangements of protrusions which are formed on the surfaces of the magnetic disks of the embodiments of the invention.

The most suitable arrangement of the protrusions which satisfies all of the above conditions is as shown in, for example, FIG. 4.

Figure 9:
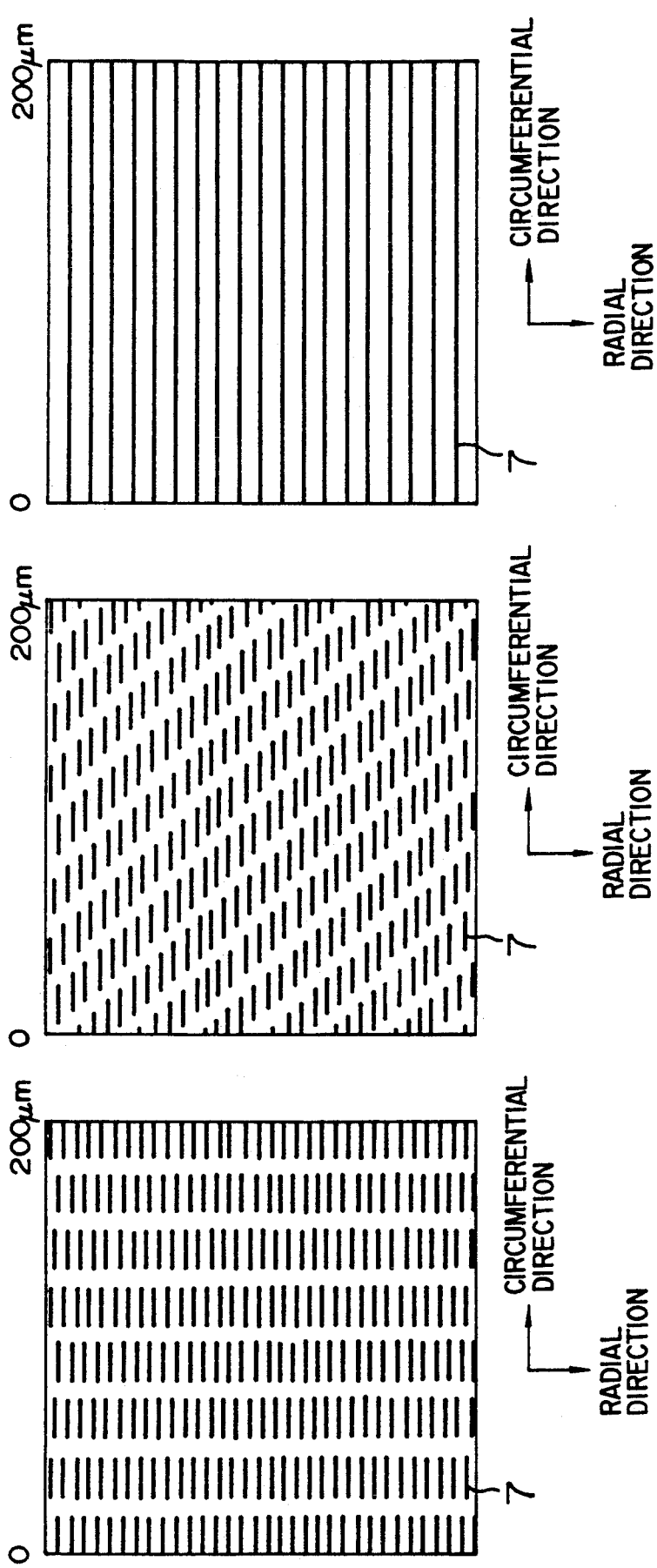

FIG. 4 is a diagram showing a state in which arc-shaped protrusions each corresponding to a central angle of, e.g., 0.02° are formed on the whole surface of the magnetic disk along arcs which are concentrical for a rotational center of the magnetic disk so as to have a width of 2 $\mu$m and a pitch of 6 $\mu$m in a manner such that the protrusions are formed every central angle of 0.03° and are sequentially deviated every 2 $\mu$m toward the inner rim side in the rotating direction of the magnetic disk. In the above practical example, in the case where a slider is put on the magnetic disk and the magnetic disk is rotated, the protrusions face the whole surface of the slider while sequentially deviating to the outer rim side, so that there is a large effect such that the dust adhered to the slider is eliminated. On the other hand, since the notched portions of protrusions 7 are linearly continuous from the inner rim of a magnetic disk 14 to the outer rim, even if micro dust enters the gap between the magnetic head and the magnetic disk, the micro dust is easily eliminated to the outer peripheral side by the centrifugal force. Actually, the magnetic disk has a shape such that a number of arc-like protrusions as shown in FIG. 4 are arranged on the whole surface. FIG. 9 shows an arrangement of the protrusions of the practical example at a real reduction scale at a position corresponding to a radius of 50 mm of the magnetic disk with respect to a square area whose one side is equal to 200 $\mu$m.

In the above example, an area ratio of the protrusions per one mm$^2$ is about 22% over the whole surface of the magnetic disk. The number of protrusions per one mm$^2$ is set to about 6500 at the position of a radius of 50 mm.

Figure 5:
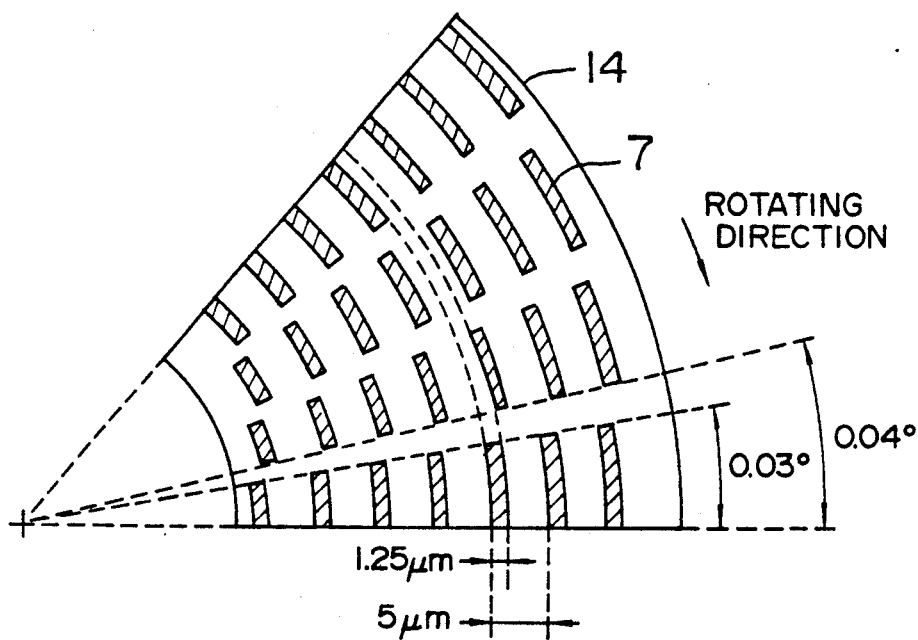
Figure 10:
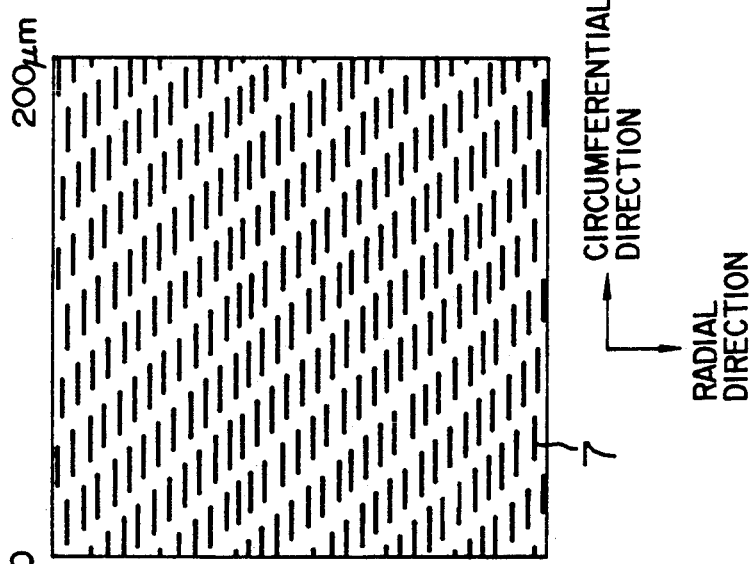

As modified examples of the above practical example, an arrangement of FIG. 5 in which the dimensions and the pitch of the protrusions are changed and an arrangement of FIG. 10 in which an array of the protrusions is obliquely deviated can be mentioned.

Figure 6:
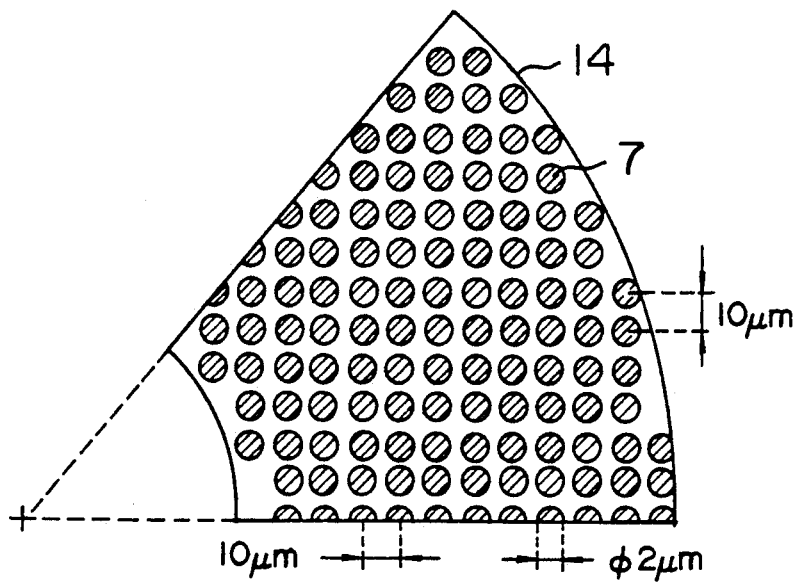

As another example, an arrangement such that pit-like protrusions are regularly arranged on the whole surface in portions corresponding to vertexes of a regular lattice pattern is suitable. When explaining an example more practically, pit-like protrusions each having a diameter of, e.g., 2 $\mu$m are arranged on the whole surface in the portions corresponding to the cross points of a square lattice having a pitch of, for example, 10 $\mu$m. FIG. 6 schematically shows an example of the arrangement pattern of the protrusions discussed above. Actually, the disk has a shape such that a number of pit-like protrusions 7 as shown in FIG. 6 are arranged on the whole surface. As a lattice pattern which is used here, in addition to the above square lattice, it is possible to use a regular pattern such as a triangular lattice, a hexagon lattice, or the like. In the case where the protrusions are arranged as mentioned above, when the slider is held in the stationary state and the magnetic disk is rotated, the protrusions intermittently face the whole surface of the slider, so that there is a large effect such that the micro dust adhered to the slider is eliminated. On the other hand, in the case of the above example, since the gap between the protrusions is linearly continuous from the inner rim of the magnetic disk to the outer rim, even if micro dust enters the gaps between the magnetic head and the magnetic disk, the micro dust can be easily eliminated to the outer peripheral side by the centrifugal force. In the example, the area ratio of the protrusions per one $mm^2$ is about 3% over the whole surface of the magnetic disk and the number of protrusions per one $mm^2$ is equal to 10,000 over the whole surface of the magnetic disk.

It is desirable that a height of each of the protrusions which are formed on the surface of the surface protective layer is set to an almost constant value within a range which is equal to or larger than 5 nm and is equal to or smaller than 40 nm. When the height of the protrusion is lower than 5 nm, the effect to reduce the frictional force between the magnetic head and the magnetic disk decreases. When the height of the protrusion is higher than 40 nm, a distance between the magnetic head and the magnetic layer of the depression between the protrusions increases upon recording/reproduction, so that an output decreases and the floating stability of the magnetic head is lost. On the other hand, if the heights of the protrusions are not uniform, the high portions function as projections, so that this is undesirable to accomplish the floating stability.

It is desirable that the area ratio of the protrusions which are formed on the surface of the surface protective layer is equal to or larger than 0.1% and is equal to or smaller than 80%, preferably, it is equal to or larger than 0.5% and is equal to or smaller than 20%. When the area ratio of the protrusions is smaller than 0.1%, the magnetic head is supported by a small area, so that the region of the protrusions is easily abraded and the sliding durability for a long time deteriorates. In addition, when the area ratio of the protrusions is small, there is a fear such that the floating stability of the head will be lost. On the contrary, when the area ratio of the protrusion is larger than 80%, the effect to reduce the frictional force between the magnetic head and the magnetic disk decreases.

A range where the protrusions are formed on the surface protective layer can be set to the whole surface of the magnetic disk. However, in the case where a contact start/stop (CSS) zone is specially provided in accordance with the specifications of the magnetic disk apparatus into which the magnetic disk is assembled, the protrusions can be also formed in only the CSS zone portion. This is because the frictional force between the magnetic disk and the magnetic head, influence by the micro dust, and the like cause problems mainly at the actuation and stop of the magnetic disk apparatus as mentioned above, and in a state in which the magnetic head is stably floating, the effect to form the protrusions is relatively small.

As a material of the protective layer, it is desirable to use a material having a high hardness from a viewpoint of the abrasion resistance. As such a material, for instance, it is desirable to use a material comprising one kind selected from an oxide, a nitride, and a carbide of a metal such as Al, Si, T, V, Cr, Zr, Nb, Mo, Hf, Ta, W, or the like, and C, BN, and the like or a compound material comprising two or more kinds of the above elements. On the other hand, when considering the magnetic disk apparatus, it is desirable that the hardness of the material of the protective layer of the magnetic disk is equal to or higher than the hardness of the slider material of the magnetic head which is combined. This is because in the case where abrasion occurs due to the sliding motion, if the protective layer is abraded, deterioration of the characteristics of the magnetic disk is easily caused, but the micro abrasion on the slider side has relatively little influence on the characteristics of the magnetic head. As a practical example of such a combination, for instance, a combination of the above protective layer material and the Mn-Zn ferrite slider or the like can be considered.

A practical method of forming the magnetic disk according to the invention will now be described hereinbelow. A magnetic layer and a protective layer are formed on a nonmagnetic disk-like base plate which is mirror-surface finished. There is also a case where an intermediate layer is formed between the base plate and the magnetic layer. As a method of forming protrusions onto the surface of the protective layer, it is preferable to use a method whereby after a desired mask pattern is formed on the surface of the protective layer by, for instance, a lithography technique, the etching is executed, only the portions which are not covered by the mask pattern are selectively uniformly etched and eliminated until a predetermined depth which is equal to or smaller than the film thickness of the protective layer, and thereafter, the mask pattern is eliminated. As an etching method which is used here, either one of the dry etching method such as ion milling, reactive plasma processing, or the like, the wet etching method, and the like is selected in accordance with the material of the protective layer. On the other hand, although a uniform single-layer structure can be used as a protective layer which is used here, if a double-layer structure comprising the upper and lower layers is used and the above pattern formation is executed under the condition, such that only the upper layer is etched, protrusions each having a predetermined height which are made of the material of the upper layer protective layer can be formed onto the lower layer protective layer having a predetermined film thickness.

As another method of forming the protrusions, the protrusions can be also similarly formed by a method whereby a material which can be hardened by irradiating a light beam, a laser beam, or a charged particle beam is formed like a film onto the surface of the protective layer, the light beam, laser beam, or charged particle beam is regularly irradiated to desired positions on the film surface, and the film surface is partially hardened, and thereafter, the unhardened portions are eliminated.

On the other hand, methods other than the above methods can be also used if the shapes of the protrusions which are finally obtained are desired shapes. For example, the protrusions of shapes similar to those mentioned above can be also formed by a method (laser CVD method) or the like whereby an organic metal gas of the light decomposition type is introduced onto a disk such that a magnetic layer and a protective layer are formed on a nonmagnetic disk which is mirror-surface finished, the laser beam is periodically and regularly irradiated onto the disk, and the metal is selectively precipitated.

A lubricating layer is formed as necessary onto the protective layer in which the protrusions are formed on the surface as mentioned above, so that the magnetic disk is formed.

The manufacturing method of forming the protrusions onto the surface of the protective layer has been described above. However, if the intermediate layer, magnetic layer, protective layer, and lubricating layer each having predetermined thicknesses are formed after the protrusions are formed onto the base plate which is mirror-surface finished by a method similar the above method, for instance, the shapes of the protrusions formed on the base plate are substantially maintained until the surface of the magnetic disk, so that a magnetic disk having a similar surface shape can be obtained.

Figure 8:
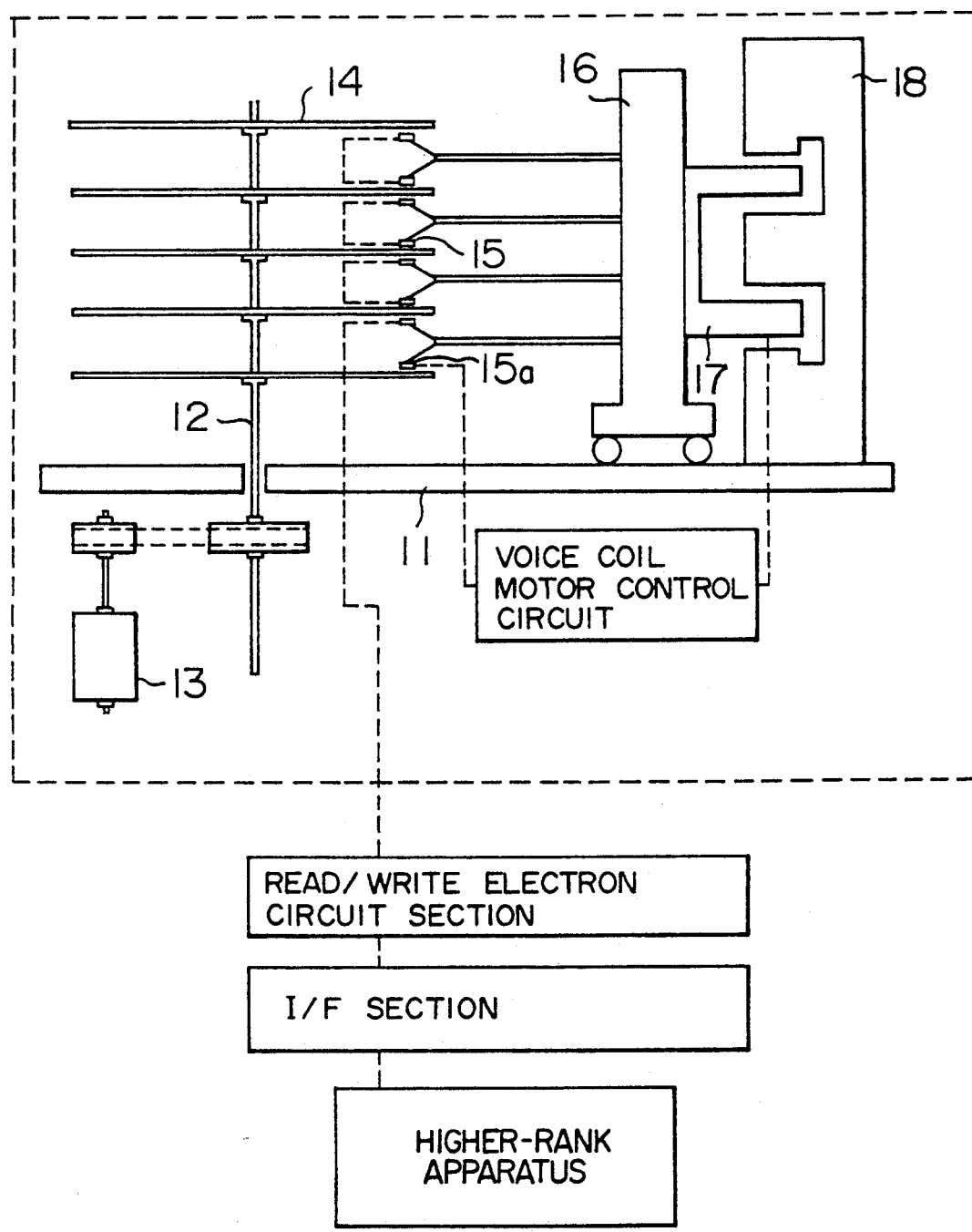
FIG. 8 is a schematic constructional diagram showing an embodiment of a magnetic disk apparatus of the invention.

FIG. 8 is a schematic diagram showing a construction of a magnetic disk apparatus according to an embodiment of the invention.

The magnetic disk apparatus includes component elements indicated by reference numerals 11 to 18 and 15a and a voice coil motor control circuit shown in FIG. 8.

Reference numeral 11 denotes a base and 12 indicates a spindle.

A plurality of disk-shaped magnetic disks 14 are attached to one spindle as shown in the diagram.

FIG. 8 shows an example in which five magnetic disks 14 are attached to one spindle. However, the number of magnetic disks is not limited to five.

On the other hand, it is also possible to install a plurality of structures in each of which a plurality of magnetic disks 14 are attached to one spindle 12.

Reference numeral 13 denotes a motor, namely, magnetic disk rotation control means for driving the spindle 12 to thereby rotate the magnetic disks.

Reference numeral 15 indicates a magnetic head for data and 15a indicates a positioning magnetic head.

Reference numeral 16 denotes a carriage, 17 a voice coil, and 18 a magnet.

A voice coil motor is formed by the voice coil 17 and the magnet 18.

The head is positioned by the elements 16, 17, and 18. Therefore, the elements 16 to 18 are generally referred to together as a magnetic head positioning mechanism.

The voice coil 17 and the magnetic heads 15 and 15a are connected through the voice coil motor control circuit.

In FIG. 8, a higher-rank system denotes, for instance, a computer system having a function to process the information recorded in the magnetic disk apparatus. In the recording and reproducing method of such an apparatus, the magnetic head is in contact with the magnetic disk before the start of the operation. However, by rotating the magnetic disk, a space is formed between the magnetic head and the magnetic disk and the recording or reproducing operation is executed in such a state. At the end of the operation, the rotation of the magnetic disk is stopped and the magnetic head and the magnetic disk once again come into contact with each other. Such a method is called a contact start/stop method, which will be referred to as a CSS method hereinafter.

EMBODIMENT 1

An under film of Ni-P of a thickness of 15 μm was formed on the surface of an aluminum alloy disk having an outer diameter of 5.25 inches by an electroless plating method. The under film was abraded to a thickness of 10 μm and was mirror-surface finished so that an average roughness ($R_a$) was equal to or less than 3 nm and the maximum roughness ($R_{max}$) is equal to or less than 7 nm when measured by using the tracer type surface roughness measuring instrument.

A Cr intermediate layer of a thickness of 0.2 μm, a Co-Ni magnetic layer of a thickness of 40 nm, and a C protective layer of a thickness of 20 nm were formed onto the base plate obtained as mentioned above by a sputtering method. A positive type resist (OFPR800 made by Tokyo Applied Chemical Co., Ltd.) of a thickness of about 0.5 μm was coated onto the surface of the C protective layer. A photo mask having a shape as shown in FIG. 4 which had been formed so as not to transmit the light through only the protrusions was adhered onto the resist and was exposed. After that, the disk was developed and a mask pattern having a shape shown in FIG. 4 in which the resist remains in only the protrusions was formed on the surface of the C protective layer.

An argon ion beam was irradiated onto the whole surface of the disk for 30 seconds by using the ion milling apparatus and the portions in which the mask pattern was not formed were uniformly etched. After that, the mask pattern was eliminated by using a resist eliminating liquid and the protrusions which were regularly arranged on the surface of the protective layer were formed.

A lubricating agent of the perfluoro polyether system of a thickness of about 5 nm was coated as a lubricating layer onto the surface of the disk which had been obtained as mentioned above and a magnetic disk was formed. The heights of the protrusions formed were measured at ten arbitrary points of the surface of the magnetic disk by using the scanning tunneling microscope (STM) and the tracer type surface roughness measuring instrument. Thus, the heights of the protrusions at all of the measuring points were 10 nm. The surface of the magnetic disk obtained was measured by an Auger electron spectral method. Thus, it was confirmed that Co and Ni were not detected and no exposed portion of the magnetic layer existed. The dimensions of the protrusions and the distance between the protrusions were as shown in FIG. 4.

Figure 1:
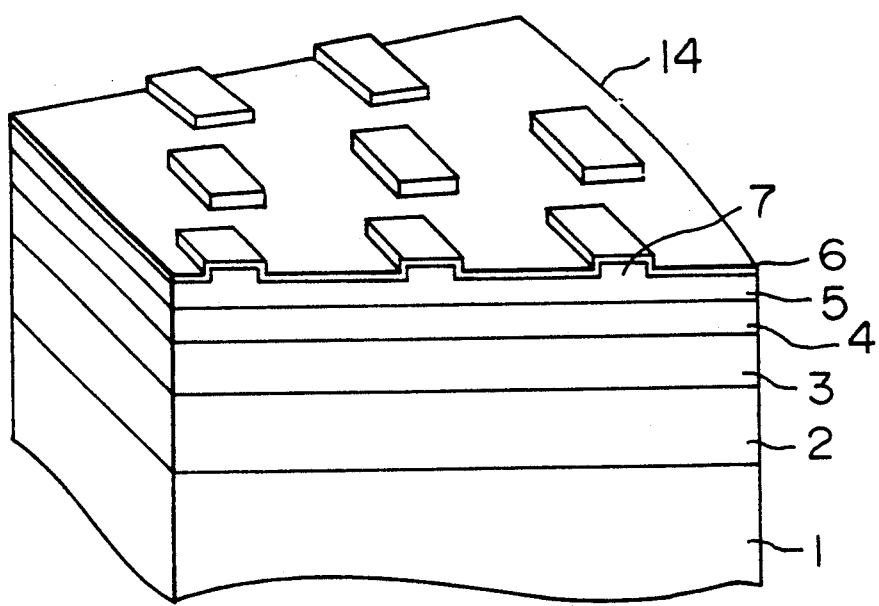
FIGS. 1 to 3 are perspective views showing cross sectional structures in the radial direction of magnetic disks according to embodiments of the present invention.

FIG. 1 shows a schematic diagram of a cross sectional structure in the radial direction of the magnetic disk of the embodiment. In FIG. 1, reference numeral 1 denotes an aluminum alloy disk; 2 indicates an under layer; 3 an intermediate layer; 4 a magnetic layer; 5 a protective layer; and 6 a lubricating layer. A base plate is constructed by the disk 1 and the under layer 2. In the embodiment, the area ratio of the protrusions is about 22% for the whole surface.

EMBODIMENT 2

Figure 7:
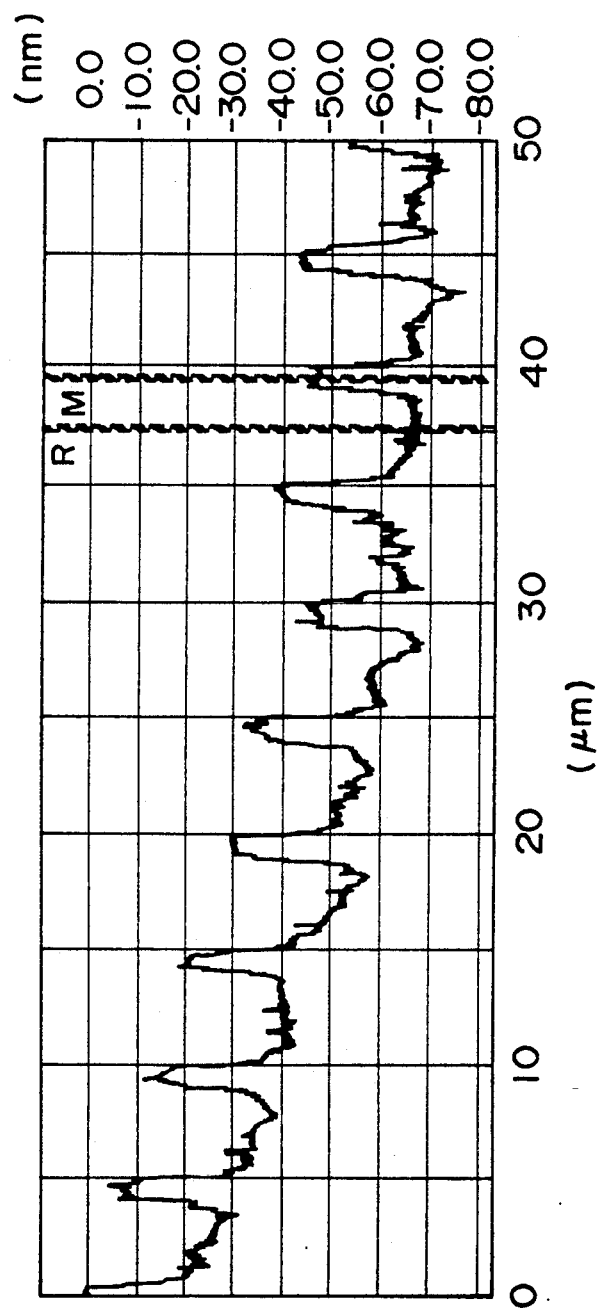
FIG. 7 is a graph showing an example of the result in the case where a protrusion of the magnetic disk according to an embodiment of the invention was measured in the radial direction by using a tracer type surface roughness measuring instrument.

A magnetic disk was formed by a method similar to the embodiment 1 except that a photo mask having a shape shown in FIG. 5 which was formed so as not to transmit the light through only the protrusions was used and the thickness of a C protective layer was set to 30 nm and the etching time by the ion milling to form the protrusions was set to one minute. The heights of the protrusions were measured at ten arbitrary points of the surface of the magnetic disk by the scanning tunneling microscope and the tracer type surface roughness measuring instrument. Thus, the heights of the protrusions were 20 nm at all of the measuring points. The dimensions of the protrusions and the distance between the protrusions were as shown in FIG. 5. FIG. 7 shows an example of the results in the case where the protrusions on the surface of the magnetic disk according to the embodiment were measured in the radial direction by the tracer type surface roughness measuring instrument. In the embodiment, the area ratio of the protrusions was about 20% for the whole surface.

EMBODIMENT 3

A magnetic disk was formed by a method similar to the embodiment 1 except that a photo mask having a shape shown in FIG. 6 which was formed so as not to transmit the light through only the protrusions was used. The heights of the protrusions were measured at ten arbitrary points on the surface of the magnetic disk by the STM and the tracer type surface roughness measuring instrument. Thus, the heights of the protrusions were 10 nm at all of the measuring points. The dimensions of the protrusions and the distance between the protrusions were as shown in FIG. 6.

Figure 2:
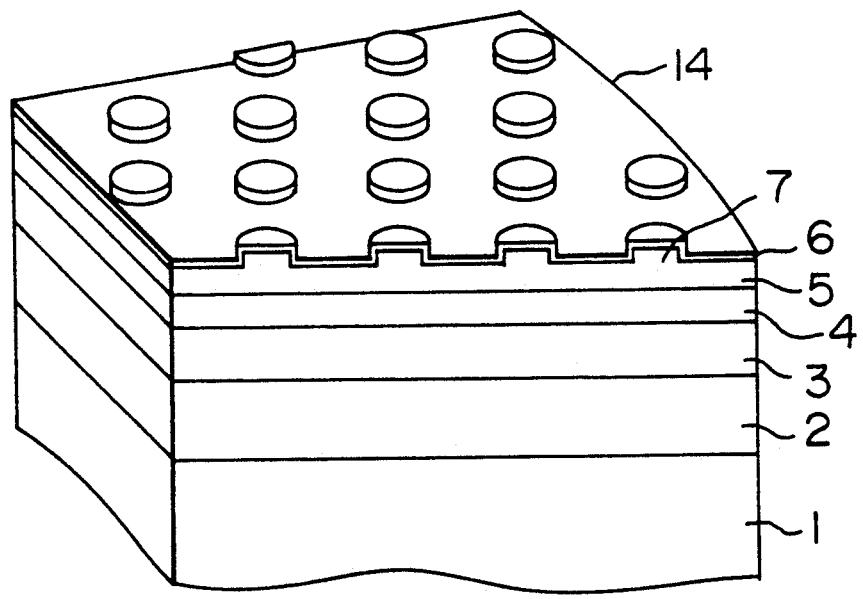

FIG. 2 shows a schematic diagram of a cross sectional structure in the radial direction of the magnetic disk of the embodiment. In the embodiment, the area ratio of the protrusions was about 3% for the whole surface.

EMBODIMENT 4

A magnetic disk was formed by a method similar to the embodiment 3 except that an SiC layer of a thickness of 20 nm was formed as a protective layer by a sputtering method and the etching time by the ion milling to form the protrusions was set to 20 seconds. The heights of the protrusions were measured at ten arbitrary points on the surface of the magnetic disk by the tracer type surface roughness measuring instrument. Thus, the heights of the protrusions were 10 nm at all of the measuring points.

EMBODIMENT 5

A magnetic disk was formed by a method similar to the embodiment 3 except that a C film (what is called an i-C) having a thickness of 20 nm which was formed by a plasma CVD method using methane-hydrogen mixture gases as a raw material was used as a protective layer and the etching time by the ion milling to form the protrusions was set to one minute. The heights of the protrusions were measured at ten arbitrary points on the surface of the magnetic disk by the tracer type surface roughness measuring instrument. Thus, the heights of the protrusions were 10 nm at all of the measuring points.

EMBODIMENT 6

A Cr intermediate layer of a thickness of 0.2 μm, a Co-Ni magnetic layer of a thickness of 40 nm, an SiC film as a first protective layer of a thickness of 10 nm, and a C film as a second protective layer of a thickness of 10 nm were formed by a sputtering method onto a base plate similar to that in the embodiment 1. A mask pattern was formed onto the surface of the C second protective layer by a method similar to the embodiment 3 and was subjected to an oxygen plasma for one minute by using an oxygen ashing apparatus. After that, the mask pattern was eliminated by a resist eliminating liquid. The surface of the disk obtained was analyzed. Thus, in the portion without the mask pattern, it has been found that the C film was eliminated by the etching using the oxygen plasma and the SiC film was exposed and the C film remained like a protrusions in only the portion of the mask pattern. The heights of the protrusions were measured at ten arbitrary ten points on the surface of the disk by the tracer type surface roughness measuring instrument. Thus, the heights of the protrusions were 10 nm at all of the measuring points. Therefore, it has been found that the SiC film was hardly etched by the oxygen plasma.

A lubricating agent of the perfluoro polyether system of a thickness of about 5 nm was coated as a lubricating layer onto the surface of the disk obtained as mentioned above and the magnetic disk was formed.

EMBODIMENT 7

A Cr intermediate layer of a thickness of 0.2 μm, a Co-Ni magnetic layer of a thickness of 40 nm, and an SiC layer of a thickness of 10 nm as a protective layer were formed by a sputtering method onto a base plate similar to that of the embodiment 1. A solution of tetrahydroxy silane of a thickness of about 15 nm was spin coated onto the surface of the SiC protective layer. After that, an Ar laser beam which was converged into a spot diameter of 2 μm was selectively irradiated to only the protrusions in accordance with the pattern shown in FIG. 4. Tetrahydroxy silane of the irradiated portion was changed to $SiO_2$ and hardened. After that, tetrahydroxy silane of the unhardened portion was washed and eliminated, so that the protrusions which were regularly arranged on the surface of the protective layer were formed as shown in FIG. 4.

A lubricating agent of the perfluoro polyether system of a thickness of about 5 nm was coated as a lubricating layer onto the surface of the disk obtained as mentioned above and the magnetic disk was formed. The heights of the protrusions formed were measured at ten arbitrary points on the surface of the magnetic disk by the tracer type surface roughness measuring instrument. Thus, the heights of the protrusions were 10 nm at all of the measuring points.

In the embodiment, the area ratio of the protrusion was about 22% for the whole surface.

EMBODIMENT 8

A magnetic disk was formed by a method similar to the embodiment 1 except that a reinforced glass disk of an outer diameter of 5.25 inches which had been mirror-surface finished in a manner such that the average roughness ($R_a$) was equal to or smaller than 2 nm and the maximum roughness ($R_{max}$) was equal to or less than 5 nm when measured by the tracer type surface roughness measuring instrument was used as a base plate. The heights of the protrusions were measured at ten arbitrary points on the surface of the magnetic disk by the tracer type surface roughness measuring instrument. Thus, the heights of the protrusions were 10 nm at all of the measuring points.

EMBODIMENT 9

Figure 11:
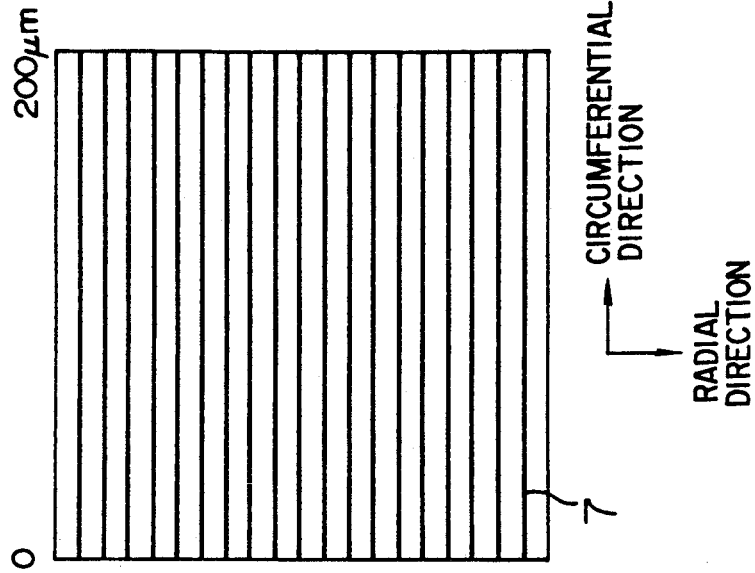
FIGS. 9 to 11 are plan views showing examples of shapes and distributions of the protrusions on the surfaces of the magnetic disks.

A magnetic disk was formed by a method similar to the embodiment 1 except that a photo mask having a width of 2 μm and a pitch of 10 μm which was formed so as not to transmit the light through the concentrical portions was used. The surface of the magnetic disk was observed by an electron microscope, so that it has been found that the concentrical protrusions having a width of 2 μm and a pitch of 10 μm were formed on the whole surface. The heights of the protrusions were measured at ten arbitrary points on the surface of the magnetic disk by the STM and the tracer type surface roughness measuring instrument. Thus, the heights of the protrusions were 10 nm at all of the measuring points. The arrangement of the protrusions of the embodiment was as shown in FIG. 11.

In the embodiment, the area ratio of the protrusions was 20% for the whole surface.

EMBODIMENT 10

By a method similar to the embodiment 1, a mask pattern was directly formed onto a base plate similar to that in the embodiment 1 and an argon ion beam was irradiated to the whole surface for ten seconds by an ion milling apparatus. After that, the mask pattern was eliminated and protrusions which were regularly arranged on the surface of the base plate were formed. The heights of the protrusions were measured at ten arbitrary points on the surface of the base plate by the tracer type surface roughness measuring instrument. Thus, the heights of the protrusions were 10 nm at all of the measuring points.

An intermediate layer, a magnetic layer, and a protective layer were formed on the base plate by a sputtering method by a method similar to the embodiment 1. A lubricating agent of the perfluoro polyether system of a thickness of about 5 nm was directly coated as a lubricating layer onto the protective layer and a magnetic disk was formed. The heights of the protrusions were measured at ten arbitrary points on the surface of the magnetic disk by the tracer type surface roughness measuring instrument. Thus, the heights of the protrusions were 10 nm at all of the measuring points. It has been found that the shapes of the protrusions formed on the base plate were substantially maintained out to the surface of the magnetic disk.

Figure 3:
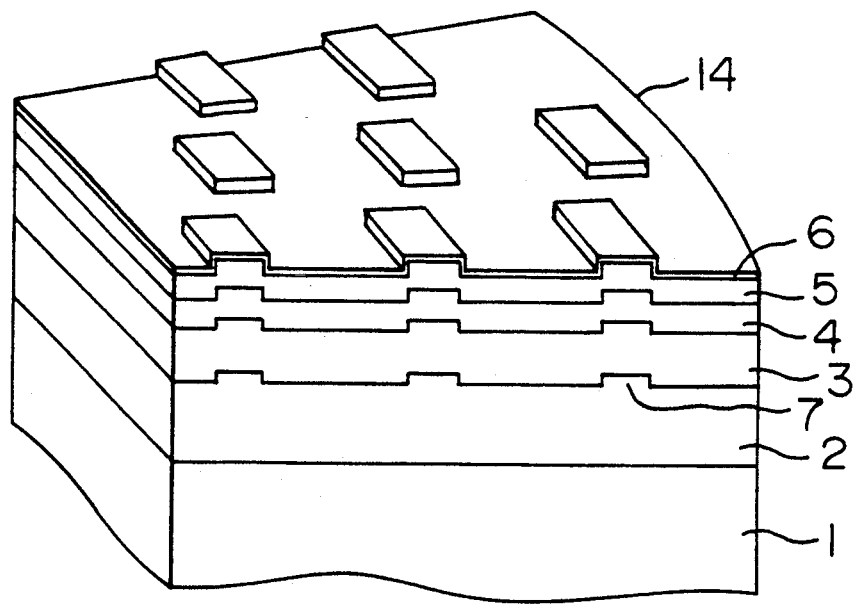

FIG. 3 shows a schematic diagram of a cross sectional structure in the radial direction of the magnetic disk of the embodiment.

EMBODIMENT 11

Magnetic disks in which the area ratio of the protrusions and the heights of the convex portions were changed were formed by using a method similar to the embodiment 10 except that the shape of the photo mask and the etching time by the ion milling to form the protrusions were changed.

Magnetic disks in which the area ratio of the protrusions was changed from 0.1 to 80% by changing the arrangement pitch of the protrusions and the dimensions of the protrusions by using a photo mask having a shape similar to the shape shown in FIG. 6 were formed. For example, in the case where the area ratio of the protrusions is set to 0.1%, the arrangement pitch of the protrusions was set to 40 μm and the diameter of each protrusion was set to 1.4 μm. As another example, in the case where the area ratio of the protrusions is set to 50%, the arrangement pitch of the protrusions was set to 12.5 μm and the diameter of each protrusion was set to 10 μm.

Magnetic disks in which the heights of the protrusions were changed in a range from 5 to 50 nm by changing the etching time by the ion milling in a range from 5 to 50 seconds with respect to the shapes in which the area ratio of the protrusions were changed were formed. The heights of the protrusions were measured by the tracer type surface roughness measuring instrument.

COMPARISON EXAMPLE 1

An intermediate layer, a magnetic layer, and a protective layer were formed onto a base plate similar to that in the embodiment 1 by a sputtering method by a method similar to the embodiment 1. A lubricating agent of the perfluoro polyether system of a thickness of about 5 nm was directly coated as a lubricating layer onto the protective layer and a magnetic disk was formed. No protrusion was formed.

COMPARISON EXAMPLE 2

While a base plate similar to that in the embodiment 1 was rotated, a buffer in which an abrasive grain was impregnated was pressed onto the base plate and the base plate was abraded so that a continuous groove was formed substantially along the circumferential direction. The surface of the base plate obtained was measured by the tracer type surface roughness measuring instrument. Thus, the average roughness ($R_a$) was 10 nm and the maximum roughness ($R_{max}$) was 35 nm.

An intermediate layer, a magnetic layer, and a protective layer were formed by a sputtering method onto the above base plate by a method similar to the embodiment 1. A lubricating agent of the perfluoro polyether system of a thickness of about 5 nm was directly coated as a lubricating layer onto the protective layer and a magnetic disk was formed. The shape of the surface of the magnetic disk of the comparison example was measured by the STM and the result is shown in FIG. 16.

COMPARISON EXAMPLE 3

A Cr intermediate layer of a thickness of 0.2 μm, a Co-Ni magnetic layer of a thickness of 40 nm, and a C film of a thickness of 40 nm as a protective layer were formed by a sputtering method onto a base plate similar to that, in the embodiment 1. While the disk was rotated, a buffer in which an abrasive grain was impregnated was pressed onto the disk and the C protective layer was abraded to a thickness of about 10 nm and a groove was formed substantially along the circumferential direction. A lubricating agent of the perfluoro polyether system of a thickness of about 5 nm was coated as a lubricating layer onto the surface of the disk and a magnetic disk was formed.

The surface of the magnetic disk obtained was measured by the tracer type surface roughness measuring instrument. Thus, the average roughness ($R_a$) was 10 nm and the maximum roughness ($R_{max}$) was 30 nm.

COMPARISON EXAMPLE 4

A Cr intermediate layer of a thickness of 0.2 μm, a Co-Ni magnetic layer of a thickness of 40 nm, and a C film of a thickness of 30 nm as protective layer were formed onto a base plate similar to that in the embodiment 1 by a sputtering method. The disk was antisputtered in a sputtering apparatus and the C protective layer was etched to a thickness of about 10 nm.

A lubricating agent of the perfluoro polyether system of a thickness of about 5 nm was coated as a lubricating layer onto the surface of the disk obtained and a magnetic disk was formed.

The surface of the magnetic disk obtained as mentioned above was measured by the tracer type surface roughness measuring instrument. Thus, the average roughness ($R_a$) was 8 nm and the maximum roughness ($R_{max}$) was 15 nm.

The frictional forces of the magnetic disks with the magnetic head and the abrasion depths of the surfaces of the magnetic disks were measured after the tests of the minimum floating peripheral velocity (the minimum peripheral velocity at which the magnetic head does not come into contact with the protrusions on the magnetic disk) and the CSS had been executed 30,000 times with respect to the magnetic disks in which the area ratio of the protrusions and the heights of the protrusions were changed in the embodiment 11. In FIGS. 12 to 15, in the cases where the area ratio of the protrusions is set to 100% and the heights of the protrusions were set to 10 nm, the results regarding the magnetic disks on which no protrusion was formed in the comparison example 1 are shown.

Figure 12:
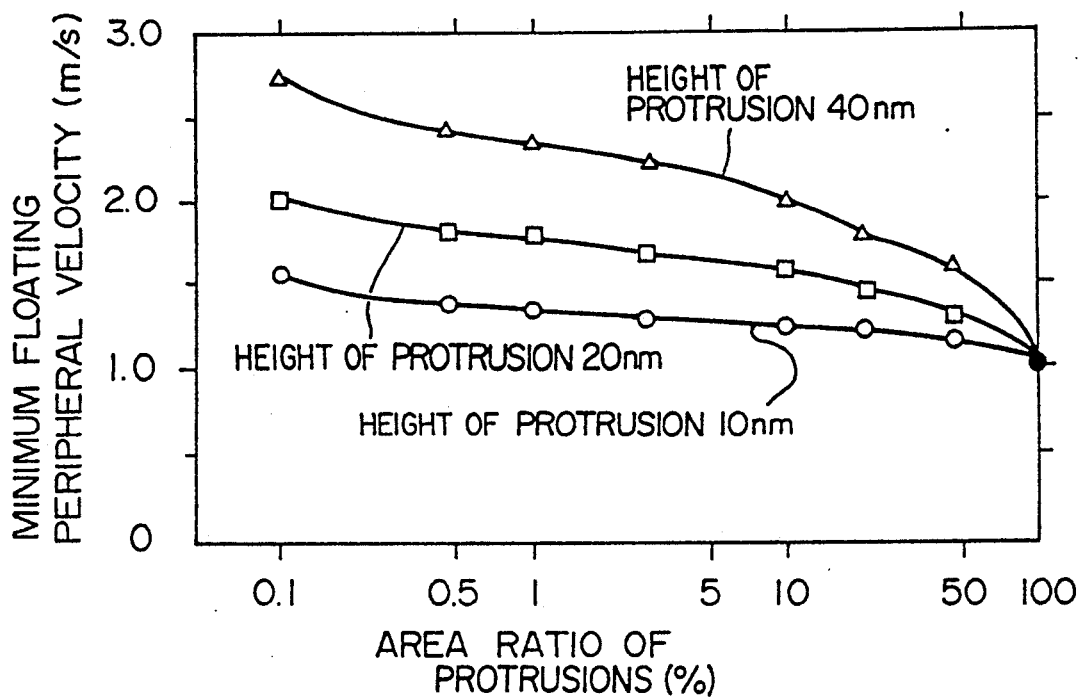
FIG. 12 is a graph showing the relation between the area ratio of the protrusions on the surface of the magnetic disk and the minimum floating peripheral velocity of a magnetic head.

FIG. 12 shows the relation among the area ratio of the protrusions, the heights of the protrusions, and the minimum floating peripheral velocity. It will be understood from the diagram that when the heights of the protrusions are large, the minimum floating peripheral velocity is large, that is, it is difficult to stably float the head by reducing the gap between the head and the magnetic disk. On the other hand, when the area ratio of the protrusions is small as well, the minimum floating peripheral velocity increases.

Figure 13:
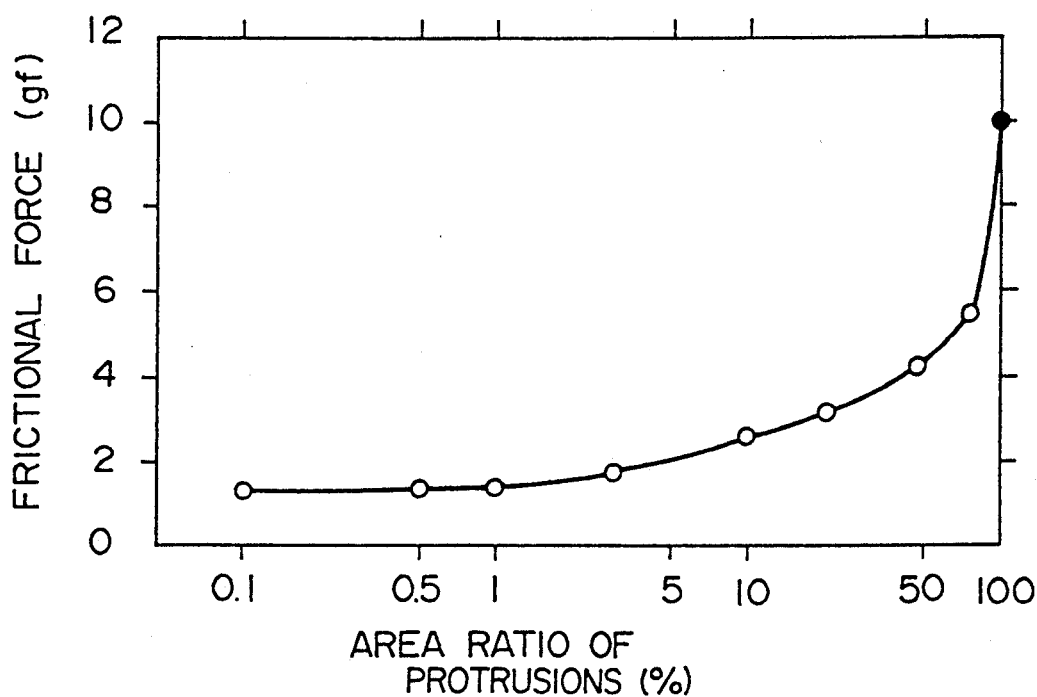
FIGS. 13 and 14 are graphs showing the relations among the area ratio of the protrusions on the surface of the magnetic disk, the protrusion height, and the frictional force.

FIG. 13 shows the relation between the area ratio of the protrusions and the frictional force in the case where the heights of the protrusions were set to a constant value of 10 nm. It will be understood from FIG. 13 that it is necessary to reduce the area ratio of the protrusions in order to decrease the frictional force.

Figure 14:
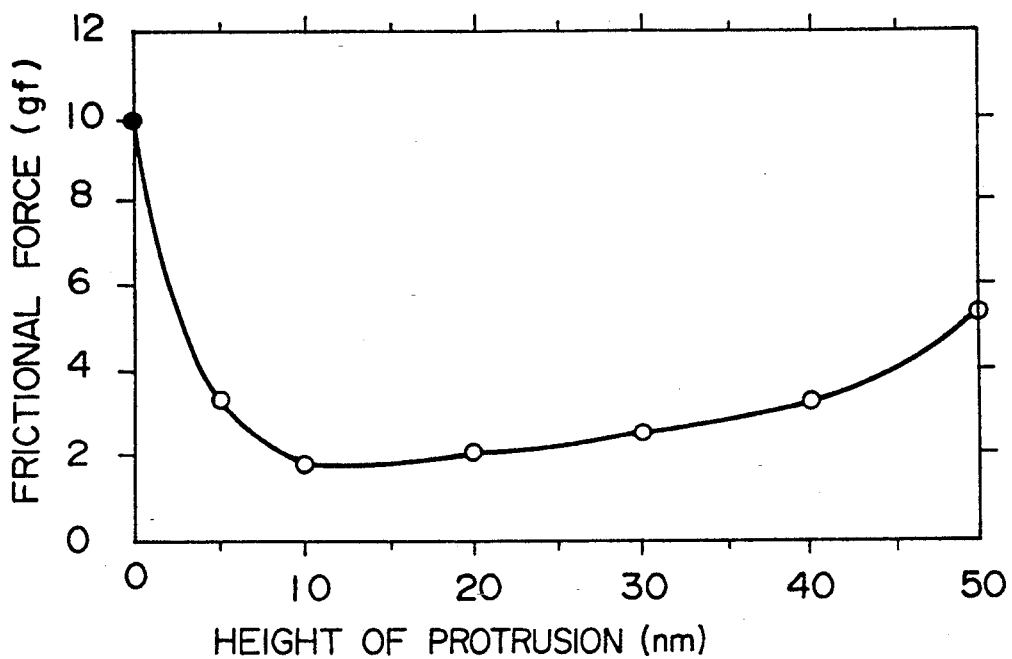

FIG. 14 shows the relation between the heights of the protrusions and the frictional force in the case where the area ratio of the protrusions was set to a constant value of 3%. FIG. 14 shows that the heights of the protrusions must be controlled within a certain range in order to reduce the frictional force.

Figure 15:
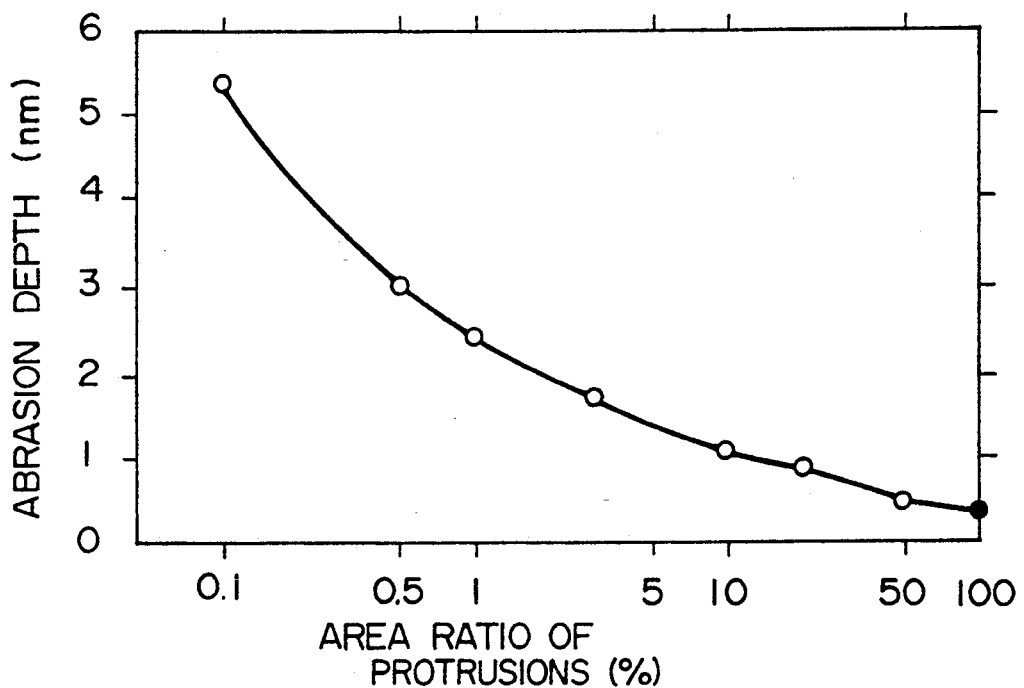
FIG. 15 is a graph showing the relation between the area ratio of the protrusions on the surface of the magnetic disk and the abrasion depth of the surface of the magnetic disk.

FIG. 15 shows the relation between the area ratio of the protrusions and the abrasion depth of the surface of the magnetic disk in the case where the heights of the protrusions were set to a constant value of 10 nm. FIG. 15 shows that it is necessary to increase the area ratio of the protrusions in order to reduce the abrasion depth.

From the above result, it will be understood that both the area ratio of the protrusions and the heights of the protrusions need to be controlled to values within specified ranges in order to obtain the good floating stability of the head and the good sliding durability performance which is specified by the frictional force and the abrasion depth.

It is desirable that the area ratio of the protrusions is equal to or larger than 0.1% and is equal to or smaller than 80%, more preferably, it is equal to or larger than 0.5% and is equal to or smaller than 20%, and most preferably, it is equal to or larger than 1% and is equal to or smaller than 10%.

It is desirable that the height of each protrusion is equal to or larger than 5 nm and is equal to or smaller than 40 nm, preferably, it is equal to or larger than 5 nm and is equal to or smaller than 20 nm.

It is desirable to control the area ratio of the protrusions and the heights of the protrusions to values within specified ranges on the surface of the magnetic disk in order to make uniform the floating stability of the head and the slide durability in the surface of the magnetic disk. For instance, it is desirable that a deviation of the area ratio of the protrusions lies within 20%.

The magnetic disk apparatus shown in FIG. 8 was constructed by using an Mn-Zn ferrite magnetic head with respect to the magnetic disks obtained in the embodiments 1 to 10 and the comparison examples. The CSS test was executed about 30,000 times. In this state, ① the inspection of the outside appearance, ② the measurement of the frictional force with the magnetic head, ③ the measurement of the minimum floating peripheral velocity of the magnetic head, and ④ the test of the recording and reproduction in the CSS regions were executed. The floating amount of the magnetic head in the stationary rotation was set to 0.1 μm. The results of the tests are shown in Table 1.

TABLE 2

(Each numerical value was obtained after execution of 30,000 CSS tests. Each numerical value in [ ] was obtained at the initial stage before the CSS tests.)

| | The number of CSS tests until the occurrence of damage | Frictional force (gf) | Minimum floating peripheral velocity (m/sec) | Recording/reproduction tests | |
|---|---|---|---|---|---|
| | | | | The number of errors per circumference | S/N ratio (dB) |
| Embodiment 1 | >30,000 | 3.2 [1.5] | 1.2 [1.2] | 0 [0] | 34 [35] |
| Embodiment 2 | >30,000 | 3.3 [1.5] | 1.4 [1.4] | 0 [0] | 31 [32] |
| Embodiment 3 | >30,000 | 1.8 [1.4] | 1.2 [1.2] | 0 [0] | 33 [35] |
| Embodiment 4 | >30,000 | 1.9 [1.3] | 1.3 [1.3] | 0 [0] | 32 [34] |
| Embodiment 5 | >30,000 | 1.8 [1.3] | 1.3 [1.3] | 0 [0] | 34 [35] |
| Embodiment 6 | >30,000 | 1.7 [1.3] | 1.3 [1.3] | 0 [0] | 33 [35] |
| Embodiment 7 | >30,000 | 3.1 [1.4] | 1.2 [1.2] | 0 [0] | 32 [33] |
| Embodiment 8 | >30,000 | 3.2 [1.4] | 1.2 [1.2] | 0 [0] | 35 [36] |
| Embodiment 10 | >30,000 | 3.1 [1.5] | 1.2 [1.2] | 0 [0] | 30 [31] |
| Embodiment 9 | 25,000 | 3.4 [1.5] | 1.5 [1.2] | 2 [0] | 31 [34] |
| Comparison | 5,000 | 10.2 | 5.3 | 34 | 19 |

TABLE 2-continued (Each numerical value was obtained after execution of 30,000 CSS tests.
Each numerical value in [ ] was obtained at the initial stage before the CSS tests.)

| | The number of CSS tests until the occurrence of damage | Frictional force (gf) | Minimum floating peripheral velocity (m/sec) | Recording/reproduction tests | |
|---|---|---|---|---|---|
| | | | | The number of errors per circumference | S/N ratio (dB) |
| example 1 | | [4.0] | [1.0] | [0] | [35] |
| Comparison example 2 | 10,000 | 8.0 [1.5] | 4.6 [2.3] | 11 [2] | 21 [26] |
| Comparison example 3 | 10,000 | 8.3 [1.5] | 4.3 [2.4] | 11 [1] | 24 [29] |
| Comparison example 4 | 10,000 | 8.2 [1.4] | 4.3 [2.2] | 7 [0] | 26 [30] |

According to the embodiment, micro depressions/protrusions which are regularly arranged so that micro dust adhered to the magnetic head or the magnetic disk can be promptly eliminated is provided on the surface of the recording disk, so that it is possible to obtain a magnetic disk in which a frictional force and an adsorbing force with the magnetic head are small, good recording and reproducing characteristics are obtained, the floating stability of the magnetic head is guaranteed, and the deterioration of the characteristics is small for a long time.

We claim:

1. A magnetic disk apparatus comprising:
  a magnetic disk having a substantially flat magnetic layer and a surface protective layer having a plurality of protrusions disposed on a substrate;
  a magnetic head which faces the magnetic disk in a rotating state with a spacing of 0.02 to 0.2 $\mu$m therebetween and is supported by a slider;
  rotating means for rotating the magnetic disk; and
  magnetic head positioning means for moving and positioning the magnetic head to a predetermined position on the magnetic disk, wherein
  the protrusions each have a substantially flat surface and are formed in at least a region on the surface of the magnetic disk where a contact start/stop operation can be executed,
  a percentage of the area of the magnetic disk occupied by the flat surfaces of the protrusions per 1 mm$^2$ lies within a range from 0.1 to 80%,
  the protrusions all have substantially a same height lying within a range from 5 to 40 nm, and
  a density of the protrusions on the magnetic disk is equal to or larger than 200/mm$^2$ and does not exceed 250,000/mm$^2$.

2. An apparatus according to claim 1, wherein the protrusions are substantially regularly arranged on the surface of the magnetic disk such that if A represents a desired percentage of the area of the magnetic disk occupied by the flat surfaces of the protrusions on a given circumference of the magnetic disk, then the percentage of the area of the magnetic disk occupied by the flat surfaces of the protrusions at any point on the given circumference lies within a range from 0.8 A to 1.2 A.

3. An apparatus according to claim 1, wherein a width of the the flat surface of each of the protrusions in the radial direction of the magnetic disk is equal to or larger than 0.1 $\mu$m and is equal to or smaller than 10 $\mu$m and a width of the the flat surface of each of the protrusions in the circumferential direction of the magnetic disk is equal to or larger than 0.5 $\mu$m and is equal to or smaller than 1 mm.

4. An apparatus according to claim 1, wherein a distance between ones of the protrusions closest to each other lies within a range from 0.2 to 50 $\mu$m.

5. An apparatus according to claim 1, wherein the protrusions are arranged so as to be sequentially deviated towards an outer peripheral side of the slider supporting the magnetic head when the magnetic disk is rotated.

6. A magnetic disk apparatus comprising:
  a magnetic disk having a substantially flat magnetic layer and a surface protective layer having a plurality of protrusions disposed on a substrate;
  a magnetic head which faces the magnetic disk in a rotating state with a spacing of 0.02 to 0.2 $\mu$m therebetween and is supported by a slider;
  rotating means for rotating the magnetic disk; and
  magnetic head positioning means for moving and positioning the magnetic head to a predetermined position on the magnetic disk, wherein
  the protrusions each have a substantially flat surface and are formed in at least a region on the surface of the magnetic disk where a contact start/stop operation can be executed,
  a percentage of the area of the magnetic disk occupied by the flat surfaces of the protrusions per 1 mm$^2$ lies within a range from 0.1 to 80%,
  the protrusions all have substantially a same height lying within a range from 5 to 40 nm,
  a density of the protrusions on the magnetic disk is equal to or larger than 200/mm$^2$ and does not exceed 250,000/mm$^2$,
  the protrusions are separated on the same circumference and the same radius of the magnetic disk, concave portions are provided between the protrusions, and
  the protrusions are arranged such that each portion of an entire surface of the slider directly opposes at least a portion of at least one of the protrusions when the slider is put at an arbitrary position on the magnetic disk and the magnetic disk is rotated once.

7. An apparatus according to claim 3, wherein a distance between ones of the protrusions closest to each other lies within a range from 0.2 to 50 $\mu$m.

8. A magnetic disk having at least a substantially flat magnetic layer and a surface protective layer having a plurality of protrusions disposed on a substrate made of a nonmagnetic disk, wherein
  the protrusions each have a substantially flat surface and are formed in at least a region on the surface of the magnetic disk where a contact start/stop operation can be executed, a percentage of the area of the magnetic disk occupied by the flat surfaces of the protrusions per 1 mm$^2$ lies within a range from 0.1 to 80%, the protrusions all have substantially a same height lying within a range from 5 to 40 nm, and a density of the protrusions on the magnetic disk is equal to or larger than 200/mm$^2$ and does not exceed 250,000/mm$^2$.

9. A magnetic disk according to claim 8, wherein the protrusions are substantially regularly arranged on the surface of the magnetic disk such that if A represents a desired percentage of the area of the magnetic disk occupied by the flat surfaces of the protrusions on a given circumference of the magnetic disk, then the percentage of the area of the magnetic disk occupied by the flat surfaces of the protrusions at any point on the given circumference lies within a range from 0.8 A to 1.2 A.

10. A magnetic disk according to claim 8, wherein the magnetic disk has a lubricating layer formed on the surface protective layer, and wherein shapes of the protrusions are maintained out to a surface of the lubricating layer.

11. A magnetic disk according to claim 8, a width of the the flat surface of each of the protrusions in the radial direction of the magnetic disk is equal to or larger than 0.1 $\mu$m and is equal to or smaller than 10 $\mu$m and a width of the the flat surface of each of the protrusions in the circumferential direction of the magnetic disk is equal to or larger than 0.5 $\mu$m and is equal to or smaller than 1 mm.

12. A magnetic disk according to claim 8, wherein the protrusions are arranged so as to be sequentially deviated towards an outer peripheral side of a slider supporting a magnetic head for use with the magnetic disk when the magnetic disk is rotated.

13. A magnetic disk according to claim 8, wherein a distance between ones of the protrusions closest to each other lies within a range from 0.2 to 50 $\mu$m.

14. A magnetic disk apparatus comprising:

a magnetic disk having a substantially flat magnetic layer and a surface protective layer having a plurality of protrusions disposed on a substrate;

a magnetic head which faces the magnetic disk in a rotating state with a spacing of 0.02 to 0.2 $\mu$m therebetween and is supported by a slider;

rotating means for rotating the magnetic disk; and magnetic head positioning means for moving and positioning the magnetic head to a predetermined position on the magnetic disk, wherein the protrusions each have a substantially flat surface and are formed in at least a region on the surface of the magnetic disk where a contact start/stop operation can be executed, a percentage of the area of the magnetic disk occupied by the flat surfaces of the protrusions per 1 mm$^2$ lies within a range from 0.1 to 80%, the protrusions all have substantially a same height lying within a range from 5 to 40 nm, and a width of the flat surface of each of the protrusions in the radial direction of the magnetic disk is equal to or larger than 0.1 $\mu$m and is equal to or smaller than 10 $\mu$m and a width of the flat surface of each of the protrusions in the circumferential direction of the magnetic disk is equal to or larger than 0.5 $\mu$m and is equal to or smaller than 1 mm.

15. A magnetic disk apparatus comprising:

a magnetic disk having a substantially flat magnetic layer and a surface protective layer having a plurality of protrusions disposed on a substrate;

a magnetic head which faces the magnetic disk in a rotating state with a spacing of 0.02 to 0.2 $\mu$m therebetween and is supported by a slider;

rotating means for rotating the magnetic disk; and magnetic head positioning means for moving and positioning the magnetic head to a predetermined position on the magnetic disk, wherein the protrusions each have a substantially flat surface and are formed in at least a region on the surface of the magnetic disk where a contact start/stop operation can be executed, a percentage of the area of the magnetic disk occupied by the flat surfaces of the protrusions per 1 mm$^2$ lies within a range from 0.1 to 80%, the protrusions all have substantially a same height lying within a range from 5 to 40 nm, and a distance between the closest protrusions on the magnetic disk lies within a range from 0.2 to 50 $\mu$m.

16. A magnetic disk apparatus comprising:

a magnetic disk having a substantially flat magnetic layer and a surface protective layer having a plurality of protrusions disposed on a substrate;

a magnetic head which faces the magnetic disk in a rotating state with a spacing of 0.02 to 0.2 $\mu$m therebetween and is supported by a slider;

rotating means for rotating the magnetic disk; and magnetic head positioning means for moving and positioning the magnetic head to a predetermined position on the magnetic disk, wherein the protrusions each have a substantially flat surface and are formed in at least a region on the surface of the magnetic disk where a contact start/stop operation can be executed, a percentage of the area of the magnetic disk occupied by the flat surfaces of the protrusions per 1 mm$^2$ lies within a range from 0.1 to 80%, the protrusions all have substantially a same height lying within a range from 5 to 40 nm, a width of the flat surface of each of the protrusions in the radial direction of the magnetic disk is equal to or larger than 0.1 $\mu$m and is equal to or smaller than 10 $\mu$m and a width of the flat surface of each of the protrusions in the circumferential direction of the magnetic disk is equal to or larger than 0.5 $\mu$m and is equal to or smaller than 1 mm, and a distance between the closest protrusions on the magnetic disk lies within a range from 0.2 to 50 $\mu$m.

17. A magnetic disk apparatus comprising:

a magnetic disk having a substantially flat magnetic layer and a surface protective layer having a plurality of protrusions disposed on a substrate;

a magnetic head which faces the magnetic disk in a rotating state with a spacing of 0.02 to 0.2 $\mu$m therebetween and is supported by a slider;

rotating means for rotating the magnetic disk; and magnetic head positioning means for moving and positioning the magnetic head to a predetermined position on the magnetic disk, wherein the protrusions each have a substantially flat surface and are formed in at least a region on the surface of the magnetic disk where a contact start/stop operation can be executed, a percentage of the area of the magnetic disk occupied by the flat surfaces of the protrusions per 1 mm² lies within a range from 0.1 to 80%, the protrusions all have substantially a same height lying within a range from 5 to 40 nm, and the protrusions are arranged to effectively eliminate micro dust disposed on the magnetic disk facing the magnetic head.

18. A magnetic disk having at least a substantially flat magnetic layer and a surface protective layer including a plurality of protrusions on the surface of the surface protective layer, wherein the protrusions each have a substantially flat surface and are formed in at least a region on the surface of the magnetic disk where a contact start/stop operation can be executed, a percentage of the area of the magnetic disk occupied by the flat surfaces of the protrusions per 1 mm² lies within a range from 0.1 to 80%, the protrusions all have substantially a same height lying within a range from 5 to 40 nm, and a width of the flat surface of each of the protrusions in the radial direction of the magnetic disk is equal to or larger than 0.1 μm and is equal to or smaller than 10 μm and a width of the flat surface of each of the protrusions in the circumferential direction of the magnetic disk is equal to or larger than 0.5 μm and is equal to or smaller than 1 mm.

19. A magnetic disk having at least a substantially flat magnetic layer and a surface protective layer including a plurality of protrusions on the surface of the surface protective layer, wherein the protrusions each have a substantially flat surface and are formed in at least a region on the surface of the magnetic disk where a contact start/stop operation can be executed, a percentage of the area of the magnetic disk occupied by the flat surfaces of the protrusions per 1 mm² lies within a range from 0.1 to 80%, the protrusions all have substantially a same height lying within a range from 5 to 40 nm, and a distance between the closest protrusions on the magnetic disk lies within a range from 0.2 to 50 μm.

20. A magnetic disk having at least a substantially flat magnetic layer and a surface protective layer including a plurality of protrusions on the surface of the surface protective layer, wherein the protrusions each have a substantially flat surface and are formed in at least a region on the surface of the magnetic disk where a contact start/stop operation can be executed, a percentage of the area of the magnetic disk occupied by the flat surfaces of the protrusions per 1 mm² lies within a range from 0.1 to 80%, the protrusions all have substantially a same height lying within a range from 5 to 40 nm, a width of the flat surface of each of the protrusions in the radial direction of the magnetic disk is equal to or larger than 0.1 μm and is equal to or smaller than 10 μm and a width of the flat surface of each of the protrusions in the circumferential direction of the magnetic disk is equal to or larger than 0.5 μm and is equal to or smaller than 1 mm, and a distance between the closest protrusions on the magnetic disk lies within a range from 0.2 to 50 μm.

* * * * *